(12) United States Patent
Yoshioka et al.

(10) Patent No.: US 6,310,543 B1
(45) Date of Patent: Oct. 30, 2001

(54) EMERGENCY CALL SYSTEM

(75) Inventors: Kenji Yoshioka, Yokohama; Yasutoshi Nakama, Ikoma; Masashi Yamamoto, Sagamihara, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/504,115

(22) Filed: Feb. 15, 2000

(51) Int. Cl.[7] .................................................. B60Q 1/00
(52) U.S. Cl. .................... 340/436; 340/426; 340/988; 342/457; 701/213
(58) Field of Search .................... 340/426, 988, 340/436, 438; 342/457; 701/213, 300, 115, 35; 455/517

(56) References Cited

U.S. PATENT DOCUMENTS

| | | | |
|---|---|---|---|
| 5,023,791 | * | 6/1991 | Herzberg et al. .................... 324/73.1 |
| 5,781,101 | * | 7/1998 | Stephen et al. .................... 340/286.02 |
| 5,809,520 | * | 9/1998 | Edwards et al. .................... 711/115 |
| 5,859,628 | * | 1/1999 | Ross et al. .................... 314/173 |
| 6,088,636 | * | 7/2000 | Chigumira et al. .................... 701/26 |

FOREIGN PATENT DOCUMENTS 4-366714    12/1992   (JP) .

* cited by examiner

*Primary Examiner*—Brent A. Swarthout
(74) *Attorney, Agent, or Firm*—Parkhurst & Wendel, L.L.P.

(57) ABSTRACT

An emergency call system disposed in a vehicle for sending data such as on the present location of the vehicle as well as a registered details of the vehicle to an emergency call system-governing center such as a police station and an emergency call center in case of emergency such as a traffic accident or sudden illness, the improvement wherein emergency call system terminal equipment is controllable from the outside thereof. The emergency call system according to the present invention includes an emergency call communication means for telephoning the emergency call system-governing center via a telecommunication enterpriser's base station, a control section for sending data such as on a vehicle's travelling or heading direction as well as a vehicle's location to the emergency call system-governing center, and a connection interface for causing one interface signal from the emergency call communication means and another from the control section to be sent out to the outside of the emergency call system terminal equipment, thereby permitting these interface signals to interface with the respective external connection equipment.

18 Claims, 6 Drawing Sheets

EMERGENCY CALL SYSTEM

BACKGROUND OF THE INVENTION

1. Field of the Invention

This invention relates to an emergency call system having emergency call system terminal equipment disposed in a vehicle such as an automobile for sending data such as on the present location of the vehicle as well as registered details of the vehicle to an emergency call system-governing center such as a police station and an emergency call center through an emergency call communication means in case of emergency such as a traffic accident or sudden illness.

2. Description of the Related Art

There is heretofore known an emergency call system having an emergency call communication means disposed in a vehicle such as an automobile for telephoning an emergency call system-governing center such as a police station and an emergency call center via a telecommunication enterpriser's base station.

In conventional emergency call systems, however, the emergency call communication means for making such a telephone call is connected to the inside of emergency call system terminal equipment. Consequently, the emergency call communication means must be removed out of the emergency call system terminal equipment when respective interface signals from the emergency call communication means and a control section for use in external connection are sent out to the outside of the emergency call system terminal equipment.

The present invention overcomes such a drawback encountered in the prior art. An object of the present invention is to provide an emergency call system adapted to permit respective interface signals from the emergency call communication means and the control section for use in external connection to be fed to the outside of the emergency call system terminal equipment without the need for removal of the emergency call communication means from the emergency call system terminal equipment, and further designed to provide access to memory of the control section from the outside of the emergency call system terminal equipment.

SUMMARY OF THE INVENTION

In order to solve the above shortcomings, the emergency call system according to the present invention includes an emergency call communication means for telephoning an emergency call system-governing center via a telecommunication enterpriser's base station, a control section for controlling the emergency call communication means, thereby sending data including a vehicle's travelling or heading direction and a vehicle's location to the emergency call system-governing center, and a connection interface for causing an interface signal to be sent and received between the emergency call communication means and the control section, and further for allowing the emergency call communication means and the control section to be relayed to respective external connection equipment.

The present invention provides an emergency call system having an emergency call system terminal equipment positioned in a vehicle, the improvement wherein the emergency call system terminal equipment includes an emergency call communication means for telephoning an emergency call system-governing center via a telecommunication enterpriser's base station, a control section for controlling the emergency call communication means, thereby sending data including a vehicle's moving or heading direction as well as a vehicle's location to the emergency call system-governing center, and a connection interface for causing an interface signal to be sent and received between the emergency call communication means and the control section, and further for allowing the emergency call communication means and the control section to be relayed to respective external connection equipment. As a result, the interface signal between the emergency call communication means and the control section can be caused to interface with the external connecting equipment, and is thus controllable from the external connection equipment.

The present invention provides an emergency call system disposed in a vehicle, the improvement comprising: emergency call system terminal equipment adapted to automatically start sending data such as on the present location of the vehicle as well as registered details of the vehicle to an emergency call system-governing center in case of emergency such as a traffic accident or urgent illness; an emergency call communication means provided inside the emergency call system terminal equipment; a control section located inside the emergency call system terminal equipment; and, a connection interface disposed outside the emergency call system terminal equipment, wherein the emergency call communication means and the control section can be communicated to one another through the connection interface, and wherein the emergency call communication means and the control section can be connected to respective external connection equipment. As a result, the interface signal between the emergency call communication means and the control section is fed to the outside of the emergency call system terminal equipment, thereby allowing one interface signal from the emergency call communication means and another from the control section to interface with the respective external connection equipment.

The present invention provides an emergency call system in which the connection interface is detachably disposed outside the emergency call system terminal equipment, and removal of the connection interface from the emergency call system terminal equipment allows the emergency call communication means and the control section to be directly connected to the respective external connection equipment. Thus, when the connection interface is removed from the emergency call system, then the emergency call communication means and the control section can directly be linked to the respective external connection equipment.

The present invention provides an emergency call system in which the connection interface is detachably positioned inside the emergency call system terminal equipment, and removal of the connection interface from the emergency call system terminal equipment allows the emergency call communication means and the control section to be directly connected to the respective external connection equipment. Thus, when the connection interface is removed from the emergency call system terminal equipment, then the emergency call communication means and the control section can be linked to the respective external connection equipment through the emergency call system terminal equipment.

The present invention provides an emergency call system in which an external interface signal from the emergency call communication means is sent out to the outside of the emergency call system terminal equipment. As a result, the external interface signal from the emergency call communication means is fed to the outside of the terminal equipment, thereby allowing the emergency call communication means to be connected to the external connection equipment when the connection interface is detached from the emergency call system terminal equipment.

The present invention provides an emergency call system in which an external interface signal from the control section is sent out to the outside of the emergency call system terminal equipment. As a result, the external interface signal is fed from the control section to the outside of the terminal equipment, thereby allowing the control section to be connected to the external connection equipment when the connection interface is removed from the emergency call system terminal equipment.

The present invention provides an emergency call system in which removal of the connection interface from the emergency call system terminal equipment allows a signal from the external connection equipment to provide direct access to the emergency call communication means such a cell phone. As a result, an external interface signal from the emergency call communication means is transmitted to the outside of the emergency call system terminal equipment, thereby making it feasible to provide direct access to the emergency call communication means from the external connection equipment when the connection interface is removed from the emergency call system terminal equipment, which external connection equipment is linked to the outside of the emergency call system terminal equipment.

The present invention provides an emergency call system in which removal of the connection interface from the emergency call system terminal equipment allows a signal from the external connection equipment to provide direct access to the control section. As a result, an external interface signal from the control section is fed to the outside of the emergency call system terminal equipment, thereby making it possible to provide direct access to the control section from the external connection equipment when the connection interface is removed from the emergency call system terminal equipment, which external connection equipment is linked to the outside of the emergency call system terminal equipment.

The present invention provides an emergency call system in which the use of a cell phone as the emergency call communication means allows a signal from the external connection equipment to provide direct access to an external interface of the cell phone. As a result, the use of cell phone as the emergency call communication means allows the cell phone to be coupled to the external connection equipment when the connection interface is removed from the emergency call system terminal equipment, which external connection equipment is connected to the outside of the emergency call system terminal equipment.

The present invention provides an emergency call system in which the use of a cell phone as the emergency call communication means allows a signal from the external connection equipment to provide direct access to an external interface of the cell phone, thereby making it possible to gain access including writing, overwriting, and reading to a storage means of the cell phone such as internal memory thereof. As a result, the cell phone used as the emergency call communication means is connected to the external connection equipment that is linked to the outside of the emergency call system terminal equipment, whereby data can be written to the cell phone from the external connection equipment, and further the data in the cell phone can be overwritten and read therefrom.

The present invention provides an emergency call system in which the use of a cell phone as the emergency call communication means allows a signal from the external connection equipment to provide direct access to an external interface of the cell phone, whereby a phone number can be written to the cell phone from the external connection equipment, and further the phone numbers in the cell phone can be overwritten and read therefrom. As a result, the cell phone used as the emergency call communication means is connected to the external connection equipment that is linked to the outside of the emergency call system terminal equipment, whereby any phone number can be written to the cell phone from the external connection equipment, and further the telephone numbers in the cell phone can be overwritten and read from the external connection equipment.

The present invention provides an emergency call system in which the use of a personal handy phone system (PHS) as the emergency call communication means allows a signal from the external connection equipment to provide direct access to an external interface of PHS. As a result, an external interface signal from PHS that is used as the emergency call communication means is applied to the outside of the emergency call system, thereby allowing PHS to be coupled to the external connection equipment when the connection interface is removed from the emergency call system, which external connection equipment is linked to the outside of the emergency call system.

The present invention provides an emergency call system in which the use of PHS as the emergency call communication means causes a signal from the external connection equipment to provide direct access to an external interface of PHS, thereby making it possible to have access such as writing, overwriting, and reading to internal memory of PHS from the external connection equipment. As a result, PHS used as the emergency call communication means is linked to the external connection equipment that is connected to the outside of the emergency call system, whereby data can be written to PHS from the external connection equipment, and further the data in PHS can be overwritten and read therefrom.

The present invention provides an emergency call system in which the use of PHS as the emergency call communication means causes a signal from the external connection equipment to provide direct access to an external interface of PHS, whereby a phone number can be written to PHS from the external connection equipment or the phone numbers in PHS can be overwritten therefrom. As a result, PHS used as the emergency call communication means is linked to the external connection equipment that is connected to the outside of the emergency call system, whereby any phone number can be written to PHS from the external connection equipment, and further the phone numbers in PHS can be overwritten and read therefrom.

The present invention provides an emergency call system in which a signal from the external connection equipment is allowed to provide direct access to the control section inside the emergency call system terminal equipment, thereby making it possible to have access such as writing, overwriting, and reading to data in the control section. As a result, an interface signal from the control section inside the emergency call system terminal equipment is fed to the outside of the emergency call system terminal equipment, whereby data can be written to the control section from the external connection equipment, and further the data in the control section can be overwritten and read therefrom.

The present invention provides an emergency call system in which a signal from the external connection equipment is allowed to provide direct access to the control section inside the emergency call system terminal equipment, thereby making it possible to have access such as writing, overwriting, and reading to data in a storage means such as memory, which storage means is linked to the control section. As a result, an interface signal from the control section inside the emergency call system terminal equipment is fed to the outside of the emergency call system terminal equipment, whereby any data can be written to the storage means from the external connection equipment through the control section, and further the data in the storage means can be overwritten and read therefrom through the control section.

The present invention provides an emergency call system including an information-transmitting means for notifying a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status indicating that the connection interface has been removed therefrom is conveyed to the information-transmitting means such as a buzzer or LED for delivering such information to the user. The information-transmitting means advises the user of such removal of the connection interface by means of sound, illumination, or display according to the status. As a result, the emergency call system is securely operated in a normal state.

The present invention provides an emergency call system including an information-transmitting means for notifying a user of removal of the connection interface from the emergency call system terminal equipment when the connection interface is removed therefrom in a state of the emergency call system terminal equipment being electrically conducting. When the removal of the connection interface from the emergency call system terminal equipment in a state of the emergency call system terminal equipment being electrically conducting during engine start-up causes the emergency call communication means and the control section to be brought out of communication with one another, then a status indicating that the connection interface has been removed therefrom is transmitted to the information-transmitting means such as a buzzer or LED for delivering such information to the user. The information-transmitting means advises the user of such removal of the connection interface by means of sound, illumination, or display according to the status. In this way, the emergency call system is securely rendered operative in a normal state.

The present invention provides an emergency call system in which an indicator such as LED is used as an information-transmitting means for notifying a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status representing that the connection interface has been removed therefrom is sent out to the information-transmitting means that includes the indicator such as a lamp or LED. The information-transmitting means notifies the user of such removal of the connection interface according to the status by means of the indicator. In this way, the emergency call system is reliably rendered operative in a normal state.

The present invention provides an emergency call system in which an indicator is illuminated to notify a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status representing that the connection interface has been removed therefrom is applied to an information-transmitting means that includes the indicator such as a lamp or LED. The information-transmitting means notifies the user of such removal of the connection interface according to the status by the indicator being turned on. Thus, the emergency call system is reliably operated in a normal state.

The present invention provides an emergency call system in which an indicator is flickered to notify a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status indicating that the connection interface has been removed therefrom is applied to an information-transmitting means that includes the indicator such as a lamp or LED. The information-transmitting means advises the user of such removal of the connection interface according to the status by the indicator being flickered. Thus, the emergency call system is securely operated in a normal state.

The present invention provides an emergency call system in which a display such as LCD is used as an information-transmitting means for notifying a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status indicating that the connection interface has been removed therefrom is applied to the information-transmitting means that includes the display such as LCD. The information-transmitting means displays information on a display output means such as LCD according to the status, and thereby advises the user of such removal of the connection interface. Thus, the emergency call system is securely operated in a normal state.

The present invention provides an emergency call system in which an information-transmitting means emits a warning sound such as a beep for notifying a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status indicating that the connection interface has been removed therefrom is fed to the information-transmitting means that emits the warning sound such as the beep. The information-transmitting means emits the warning sound such as the beep according to the status, and thereby advises the user of such removal of the connection interface. Thus, the emergency call system is reliably operated in a normal state.

The present invention provides an emergency call system in which an information-transmitting means sends out a voice signal such as a synthetic voice for notifying a user of removal of the connection interface from the emergency call system terminal equipment when the connection interface is removed therefrom. When the removal of the connection interface from the emergency call system terminal equipment causes the emergency call communication means and the control section to be brought out of communication with one another, then a status indicating that the connection interface has been removed therefrom is sent to the information-transmitting means that makes voice such as the synthetic voice. The information-transmitting means makes voice such as the synthetic voice according to the status, and thereby advises the user of such removal of the connection interface. Thus, the emergency call system is reliably operated in a normal state.

The present invention provides an emergency call system in which removal of the connection interface from the emergency call system terminal equipment can be recorded as a history when the connection interface is removed therefrom. When the removal of the connection interface from the emergency call system terminal equipment causes the emergency call communication means and the control section to be brought out of communication with one another, then a status indicating that the connection interface has been removed therefrom is conveyed to a storage means as history data. The storage means saves data as a history according to the status, which data shows such removal of the connection interface.

The present invention provides an emergency call system in which removal of the connection interface from the emergency call system terminal equipment can be recorded as a history when the connection interface is removed therefrom in a state of the emergency call system terminal equipment being electrically conducting. When the removal of the connection interface from the emergency call system terminal equipment in a state of the emergency call system terminal equipment being electrically conducting during engine start-up causes the emergency call communication means and the control section to be brought out of communication with one another, then a status indicating that the connection interface has been removed therefrom is sent to a storage means as history data. The storage means saves data as a history according to the status, which data shows such removal of the connection interface.

The present invention provides an emergency call system in which it can be recorded as a history that a user is notified of removal of the connection interface from the emergency call system terminal equipment by means of voice, display or illumination when the connection interface is removed therefrom. When the removal of the connection interface from the emergency call system terminal equipment causes the emergency call communication means and the control section to be brought out of communication with one another, then a status indicating that the connection interface has been removed therefrom is fed into an information-transmitting means such as a buzzer or LED for transmitting such information to the user. In addition, a storage means such as memory saves it as history data that a warning has been issued in response to the removal of the connection interface from the emergency call system terminal equipment. The information-transmitting means notifies the user of such removal of the connection interface according to the status by means of sound, illumination, or display.

The present invention provides an emergency call system in which a history is fed into external connection equipment under the control of the control section when the connection interface is removed from the emergency call system terminal equipment, which history records such removal of the connection interface therefrom. Accordingly, when the emergency call system terminal equipment receives from the external connection equipment a status indicating a demand for data saved in the storage means, then one of the following data is sent out to the external connection equipment according to the status under the control of the control section: data saved in memory as a history, showing that the removal of the connection interface from the emergency call system terminal equipment causes the emergency call communication means and the control section to be brought out of communication with one another; and, other data saved in the memory as a history, representing that a user has been warned by a buzzer or LED of a status indicating such non-communication between the emergency call communication means and the control section.

The present invention provides an emergency call system in which a history is fed into the external connection equipment through an interface signal from the control section under the control of the control section when the connection interface is removed from the emergency call system terminal equipment. The interface signal from the control section is sent out to the outside of the emergency call system terminal equipment. The history records the removal of the connection interface from the emergency call system terminal equipment. Accordingly, when the emergency call system terminal equipment receives, from the external connection equipment connected to an interface of the control section, a status indicating a demand for data saved in the storage means, then one of the following data is fed into the external connection equipment under the control of the control section according to the status through the interface signal from the control section that is connected to the connection interface: data saved in memory as a history, showing that the removal of the connection interface from the emergency call system terminal equipment causes the emergency call communication means and the control section to be brought out of communication with one another; and, other data saved in the memory as a history, representing that a user has been warned by means of a buzzer or LED of a status indicating such non-communication between the emergency call communication means and the control section.

BRIEF DESCRIPTION OF THE DRAWINGS

The objects and features of the present invention will become more readily apparent from the following detailed description taken in conjunction with the accompanying drawings in which.

DESCRIPTION OF THE PREFERRED EMBODIMENTS

Now embodiments of an emergency call system according to the present invention will be described in detail with reference to the drawings.

Figure 1:
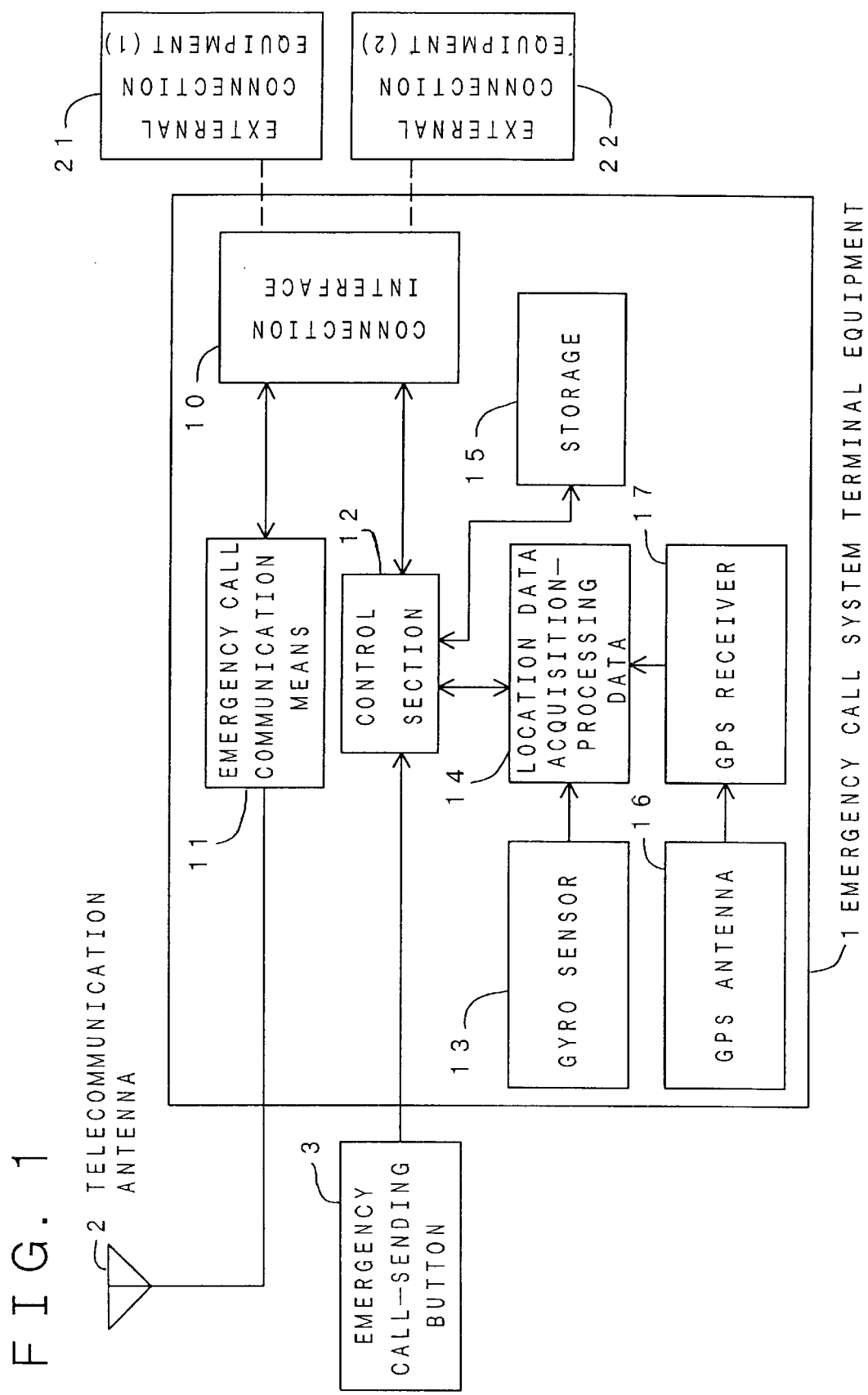
FIG. 1 is a block diagram, illustrating a construction of an emergency call system according to a first embodiment of the present invention.

FIG. 1 is a block diagram, illustrating a construction of an emergency call system according to a first embodiment of the present invention. In FIG. 1, reference numeral 1 denotes emergency call system terminal equipment disposed in a vehicle such as an automobile. The emergency call system terminal equipment 1 provides for sending data such as on the present location of the vehicle as well as registered details of the vehicle to an emergency call system-governing center such as a police station, a fire station, and an emergency call center in case of emergency such as a traffic accident or sudden illness. Reference numerals 2 and 3 denote a telecommunication antenna and an emergency call-sending button, respectively. The antenna 2 sends a sending signal from an emergency call communication means 11 to a telecommunication enterpriser's base station, while transferring a receiving signal from the telecommunication enterpriser's base station to the emergency call communication means 11. The emergency call-sending button 3 is pressed by a user in case of emergency such as a traffic accident or sudden illness, thereby generating an operation signal for initiating call processing.

In the emergency call system terminal equipment 1, reference numeral 10 denotes a connection interface for permitting an interface signal to be sent and received between the emergency call communication means 11 and the control section 12. When necessary, the connection interface 10 further allows one interface signal from the emergency call communication means 11 and another from the control section 12 to interface with external connection equipment 21 and 22, respectively.

Reference numeral 11 represents the emergency call communication means. The emergency call communication means 11 starts dialing a phone number in order to telephone a call receiver via a telecommunication enterpriser's base station in response to a call-requesting signal from the control section 12. The phone number is fed from the control section 12. The phone number identifies the call receiver. In addition, when the emergency call communication means 11 receives either a response to the above call from the call receiver or a signal therefrom such as a conversation signal indicating that the call has been shifted to conversation, then the emergency call communication means 11 recognizes that a shift to conversation has been executed, and then enters into a voice conversation control or data communication control mode. Further, the emergency call communication means 11 sends out a signal to the control section 12, which signal indicates that the shift to conversation has been realized. Moreover, the emergency call communication means 11 permits data from the control section 12 such as on a vehicle's travelling or heading direction and a vehicle's location to be sent via the telecommunication enterpriser's base station to the call receiver identified by the above telephone number, i.e., the emergency call system-governing center.

Reference numeral 12 represents the control section. The control section 12 recognizes from the operation signal sent from the emergency call-sending button 3 that a request for an emergency call has been made. In order to start emergency call processing, the control section 12 feeds a signal into a location data acquisition-processing section 14, which signal requests the location data acquisition-processing section 14 to send data on the present location of the vehicle to the control section 12. Then, the location data acquisition-processing section 14 feeds data such as on the vehicle's travelling or heading direction and the vehicle's location into the control section 12. In addition, the control section 12 acquires a telephone number of the emergency call system-governing center from a storage 15, and then requests the emergency call communication means 11 to dial the telephone number so as to make a phone call to the emergency call system-governing center. Further, when the control section 12 receives through the emergency call communication means 11 either a response to the above call from the call receiver identified by the telephone number or a signal therefrom such as a conversation signal indicating that the call has been shifted to conversation, then the control section 12 recognizes that a shift to conversation has been executed. Then, the control section 12 feeds a signal to the emergency call communication means 11, which signal permits the data from the location data acquisition-processing section 14 such as on the vehicle's travelling or heading direction and the vehicle's location to be sent via the telecommunication enterpriser's base station to the call receiver identified by the telephone number, i.e., the emergency call system-governing center.

Reference numeral 13 denotes a gyro sensor for producing data such as on a vehicle's moving or heading direction, and then transmitting the data to the location data acquisition-processing section 14.

Reference numeral 14 denotes the location data acquisition-processing section 14 for receiving data from the gyro sensor 13 that produces information such as on the vehicle's travelling or heading direction in response to the vehicular location data-requesting signal from the control section 12. In addition, the location data acquisition-processing section 14 produces data on the vehicle's location in response to data received from a GPS receiver 17 which generates the data using radio waves received through a GPS antenna 16. Then, the location data acquisition-processing section 14 sends the above-mentioned data from the gyro sensor 13 and the produced data on the vehicle's location 17 to the control section 12.

Reference numeral 15 denotes the storage which functions as a storage means. The storage 15 contains data such as on the telephone number of the emergency call system-governing center, a registration number of a vehicle having the emergency call system terminal equipment 1 disposed therein, and a registrant. The storage 15 feeds the above data of interest into the control section 12 in response to a request signal from the control section 12.

Reference numeral 16 represents the GPS antenna for receiving data from a satellite. Reference numeral 17 denotes the GPS receiver for permitting the data such as on the vehicle's location, produced from the prior data entered through the GPS antenna 16, to be transferred to the location data acquisition-processing section 14.

Next, operation of the first embodiment will be described. In the emergency call system disposed in a vehicle such as an automobile as illustrated in FIG. 1, a user presses the emergency call-sending button 3 in case of emergency such as a traffic accident or sudden illness. Upon the pressing by the user, the emergency call-sending button 3 sends out an operation signal to the control section 12 inside the emergency call system terminal equipment 1, which operation signal indicates that the button 3 has been pressed. Then, the control section 12 recognizes from the operation signal entered from the button 3 that a request for an emergency call has been made. The control section 12 thereafter starts emergency call processing, and then feeds a signal into the location data acquisition-processing section 14, which signal requests the location data acquisition-processing section 14 to send data on the present location of the vehicle to the control section 12.

The location data acquisition-processing section 14 receives the data from the gyro sensor 13 such as on the vehicle's moving or heading direction as well as the data from the GPS receiver 17 such as on the vehicle's location in response to the vehicular location data-requesting signal from the control section 12. Then, the location data acquisition-processing section 14 transfers such data from both of the gyro sensor 13 and the GPS receiver 17 to the control section 12.

The control section 12 acquires the telephone number of the emergency call system-governing center from the storage 15. Then, the control section 12 requests the emergency call communication means 11 through the connection interface 10 to dial the telephone number in order to make a phone call to the emergency call system-governing center, which connection interface 10 causes a communication signal to be sent and received between the control section 12 and the emergency call communication means 11.

The emergency call communication means 11 starts telephoning the call receiver identified by the telephone number through the telecommunication antenna 2 via the telecommunication enterpriser's base station. When the emergency call communication means 11 receives either a response to such a call from the call receiver or a signal therefrom such as a conversation signal indicating that the call has been shifted to conversation, then the emergency call communication means 11 recognizes that a shift to conversation has been realized. Then, the emergency call communication means 11 enters into voice conversation control or data communication control mode. In addition, the emergency call communication means 11 feeds a signal into the control section 12 through the connection interface 10, which signal indicates that the shift to conversation has been executed.

The control section 12 judges that the call has met with success. Then, the control section 12 permits the data from the location data acquisition-processing section 14 such as on the vehicle's moving or heading direction and the vehicle's location to be sent via the telecommunication enterpriser's base station to the call receiver identified by the telephone number, i.e., the emergency call system-governing center.

The interface signal between the emergency call communication means 11 and the control section 12 is sent and received through the connection interface 10. In addition, when it is necessary to provide direct access to the emergency call communication means 11 from the external connection equipment 21 in order to set or update data in the emergency call communication means 11, then the connection interface 10 may be removed from the emergency call system terminal equipment 1, so that the external connection equipment 21 can be connected to the emergency call communication means 11. Further, when it is necessary to provide direct access to the control section 12 from the external connection equipment 22 in order to set or update data in the control section 12, then the connection interface 10 may be removed from the emergency call system terminal equipment 1, so that the external connection equipment 22 can be connected to the control section 12.

Figure 2:
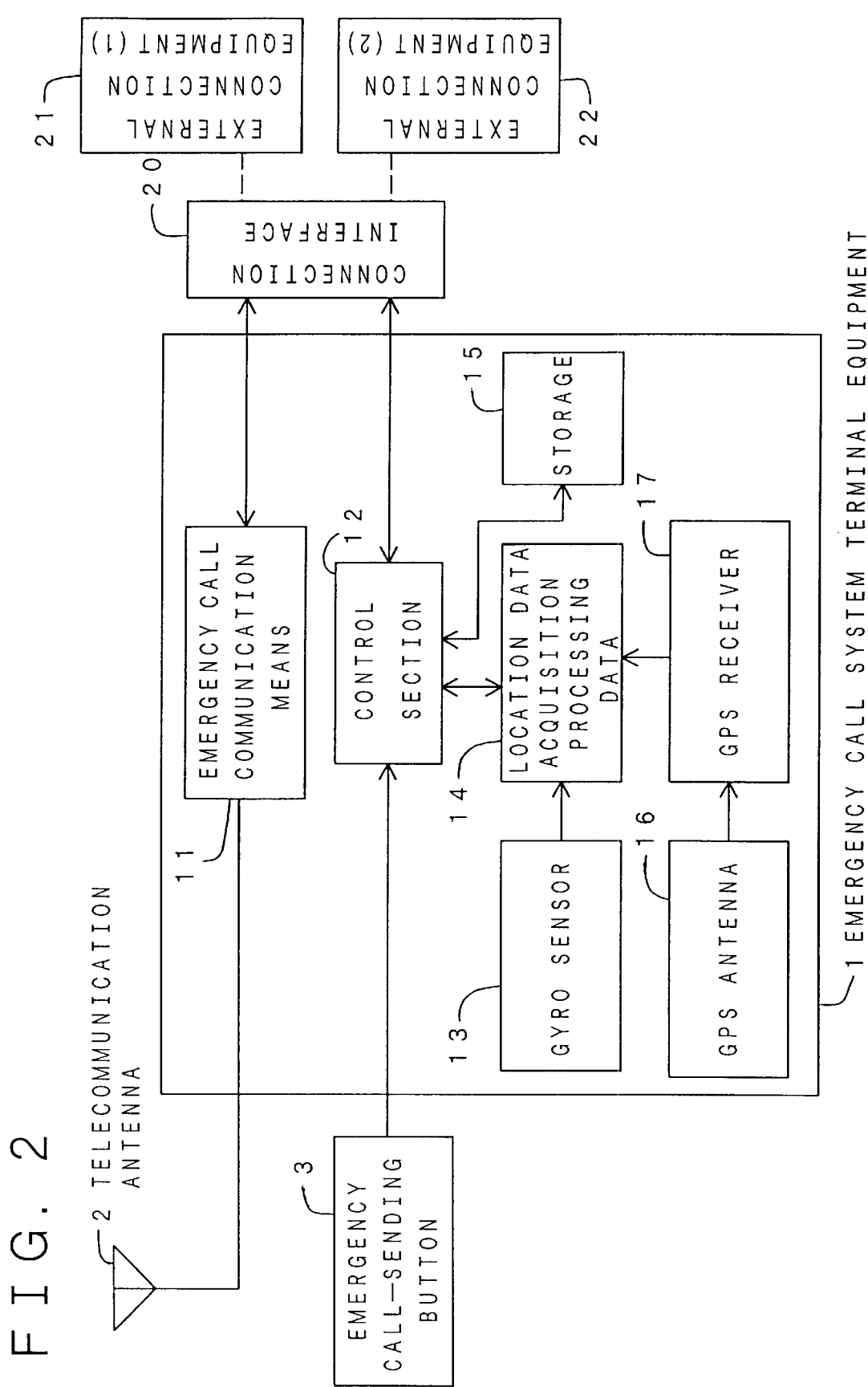
FIG. 2 is a block diagram, showing a construction of an emergency call system according to a second embodiment.

An emergency call system according to a second embodiment will now be described. FIG. 2 is a block diagram, illustrating a construction of the emergency call system according to the second embodiment. In FIG. 2, reference numeral 1 denotes emergency call system terminal equipment disposed in a vehicle such as an automobile. The emergency call system terminal equipment 1 functions to permit data such as on the present location of the vehicle as well as registered details of the vehicle to be sent to the emergency call system-governing center through a telecommunication antenna 2 by an emergency call-sending button 3 being pressed in case of emergency such as a traffic accident or sudden illness. Similar to the first embodiment, in the emergency call system terminal equipment 1, reference numeral 11 denotes an emergency call communication means; 12 a control section; 13 a gyro sensor; 14 a location data acquisition-processing section; 15 a storage; 16 a GPS antenna; and, 17 a GPS receiver. Reference numeral 20 denotes a connection interface positioned outside the terminal equipment 1. Reference numerals 21 and 22 denote external connection equipment.

According to the second embodiment, an interface signal between the emergency call communication means 11 and the control section 12 can be caused to interface with the external connection equipment 21 or 22 through the connection interface 20 that is disposed outside the emergency call system terminal equipment 1. Thus, the interface signal is controllable from the external connection equipment 21 or 22.

Figure 3A:
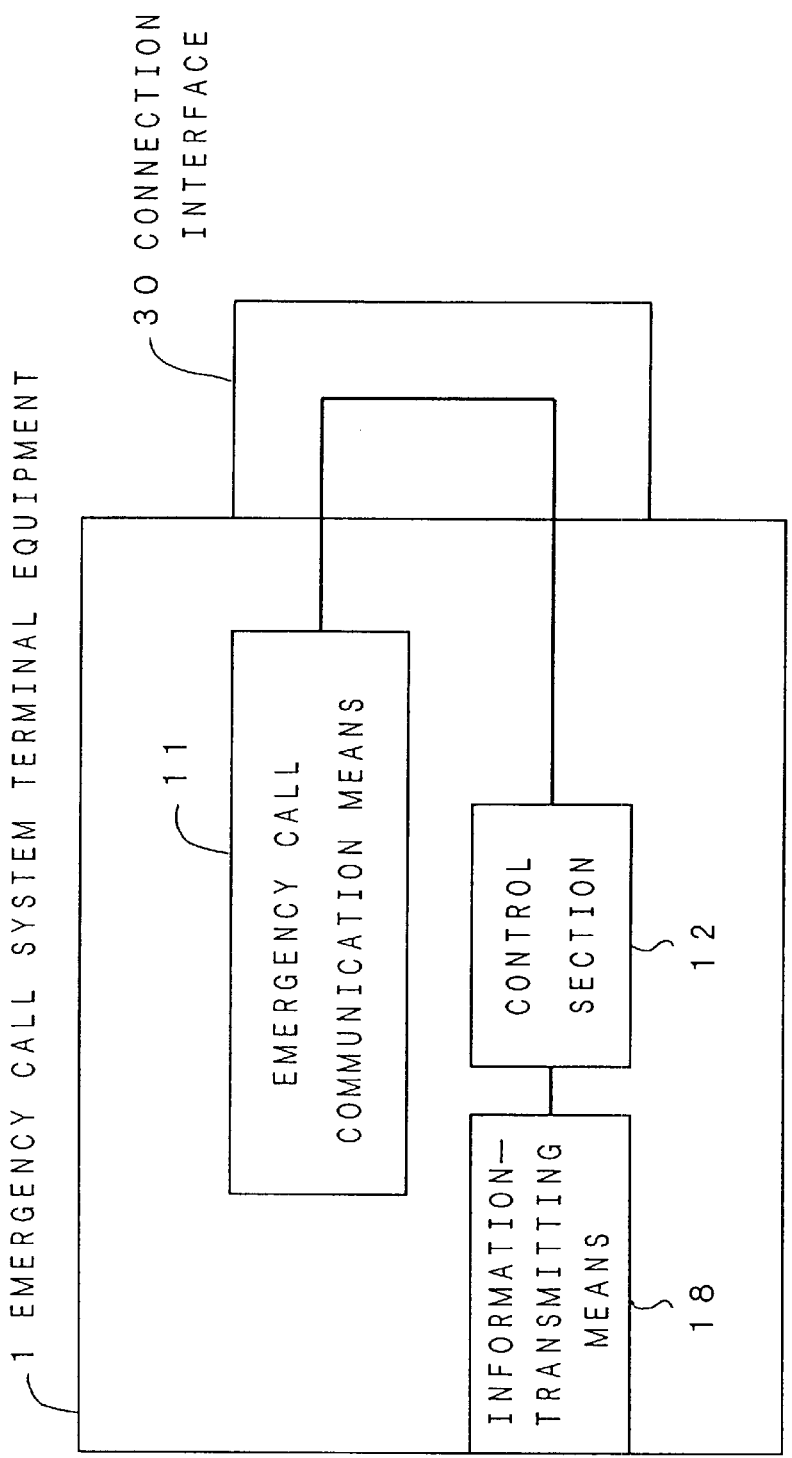
FIGS. 3A and 3B are block diagrams, showing a construction of an emergency call system according to a third embodiment; and, FIGS. 4A and 4B are block diagrams, illustrating a construction of an emergency call system according to a fourth embodiment.
Figure 3B:
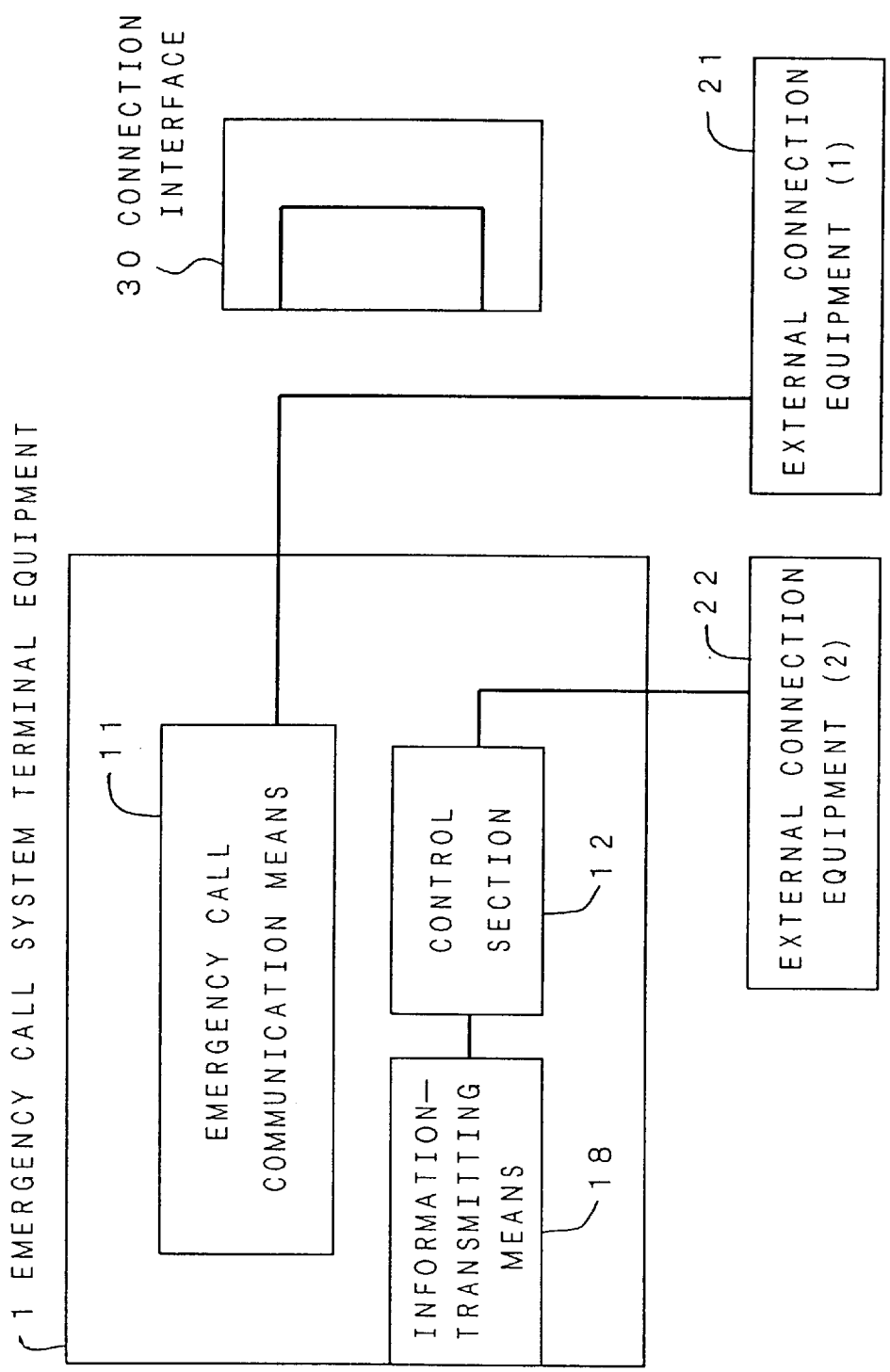

An emergency call system according to a third embodiment will now be described. FIG. 3A is a partial structural diagram, showing a part of the emergency call system according to the third embodiment. More specifically, although circuits 13 to 17 shown in FIGS. 1 and 2 are not shown in FIGS. 3A and 3B, these circuits are actually connected directly or indirectly to the control section 12 in the same manner as in FIGS. 1 and 2. In the emergency call system as illustrated in FIG. 3A, a connection interface 30 is detachably connected to the outside of the emergency call system terminal equipment 1, and an emergency call communication means 11 and a control section 12 are connected together through the connection interface 30. Turning now to FIG. 3B, the connection interface 30 is shown detached from the terminal equipment 1, and thus respective interfaces of the emergency call communication means 11 and the control section 12 are made open. Consequently, the emergency call communication means 11 and the control section 12 can be coupled to the external connection equipment 21 and 22, respectively.

According to the third embodiment, the use of the external connection equipment 21, 22 makes it possible to provide direct access to the emergency call communication means 11 from the external connection equipment 21 as well as that to the control section 12 from the external connection equipment 22. Accordingly, when a cell phone is used as the emergency call communication means 11, then the cell phone is accessible from the external connection equipment 21. Thus, telephone numbers can be written to the cell phone from the external connection equipment 21. In this connection, when the connection interface 30 is removed from the terminal equipment 1, then an information-transmitting means 18 notifies a user of such removal of the connection interface 30.

Figure 4A:
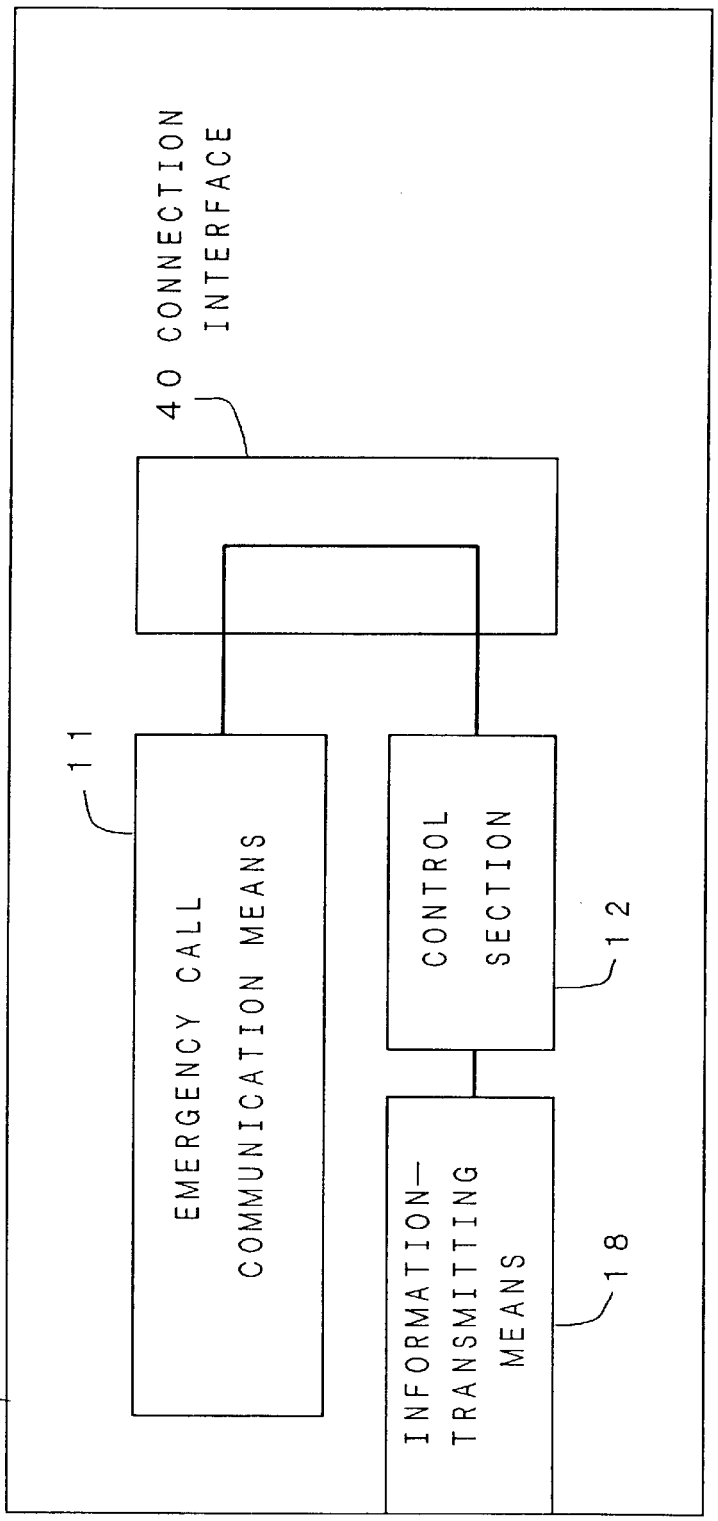
Figure 4B:
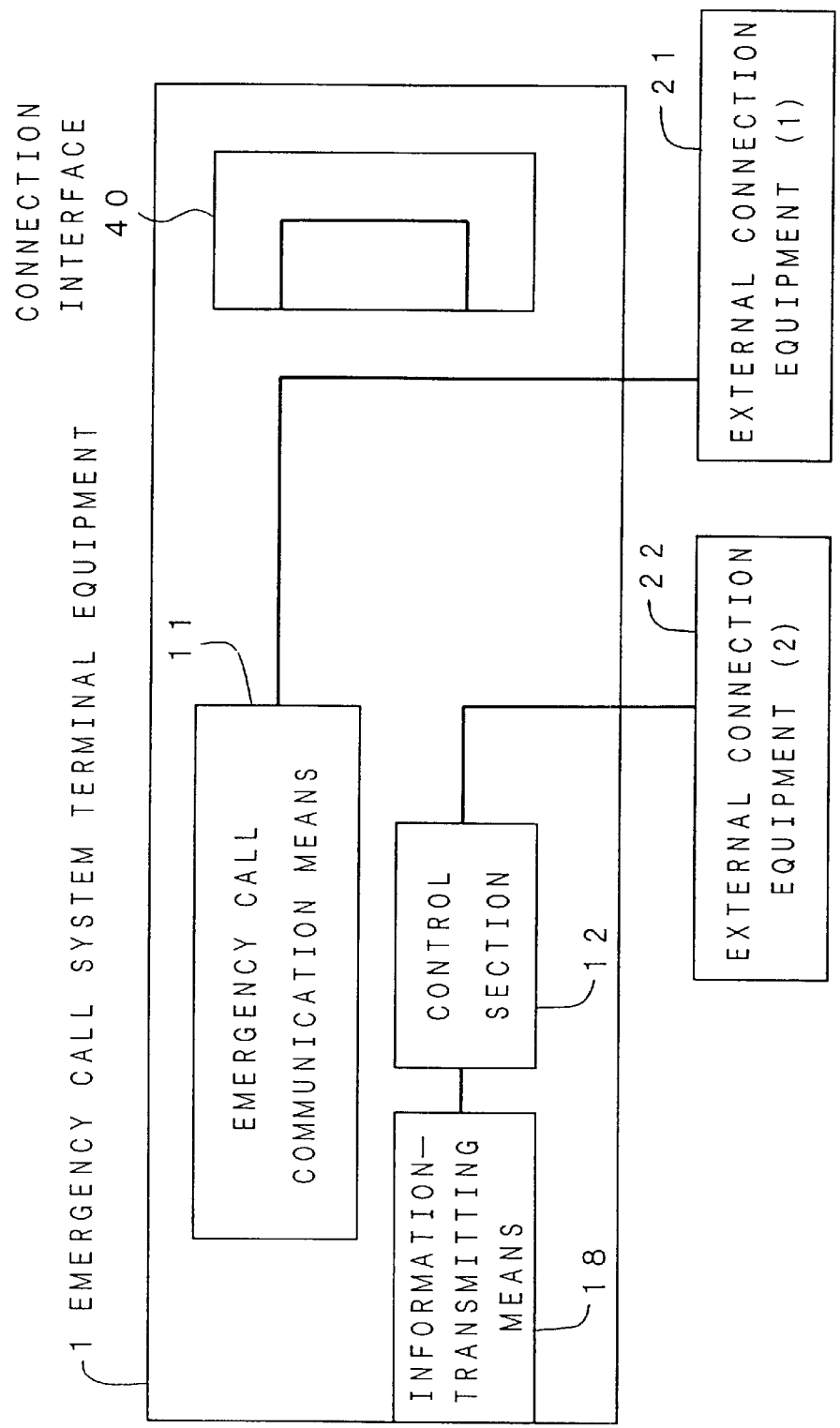

An emergency call system according to a fourth embodiment will now be described. FIG. 4A is a partial structural diagram, showing a part of the emergency call system according to the fourth embodiment. More specifically, although circuits 13 to 17 shown in FIGS. 1 and 2 are not shown in FIGS. 4A and 4B, these circuits are actually connected directly or indirectly to the control section 12 in the same manner as in FIGS. 1 and 2. In the emergency call system as illustrated in FIG. 4A, a connection interface 40 is detachably connected to the inside of the emergency call system terminal equipment 1, and an emergency call communication means 11 and a control section 12 are linked together through the connection interface 40 inside the emergency call system terminal equipment 1. As shown in FIG. 4B, the connection interface 40 located inside the terminal equipment 1 is detached therefrom, and thus respective interfaces of the emergency call communication means 11 and the control section 12 are made open. As a result, the emergency call communication means 11 and the control section 12 can be connected to the external connection equipment 21 and 22, respectively.

According to the fourth embodiment, the use of the external connection equipment 21, 22 makes it feasible to provide direct access to the emergency call communication means 11 from the external connection equipment 21 as well as that to the control section 12 from the external connection equipment 22. Accordingly, when the connection interface 40 inside the terminal equipment 1 is removed therefrom because of repair thereof or software updating, then the control section 12 is accessible from the external connection equipment 22. Thus, data can be written to memory from the external connection equipment 22, and the data in the memory can be overwritten therefrom as well. In this connection, when the connection interface 40 is removed from the emergency call system terminal equipment 1, then an information-transmitting means 18 notifies a user of such removal of the connection interface 40.

Next, an emergency call system according to a fifth embodiment will be described. In the emergency call system as shown in FIG. 1 or 2, an external interface signal from the emergency call communication means 11 is applied to the outside of the emergency call system terminal equipment 1, thereby allowing the terminal equipment 1 to be electrically coupled to the external connection equipment 21. When a cell phone is used as the emergency call communication means 11, then a 16-core interface signal from the cell phone, i.e., an external interface signal therefrom is sent out to the outside of the terminal equipment 1, thereby allowing the cell phone to be controlled and maintained from the outside of the emergency call system terminal equipment 1. Thus, a telephone number can be written to the cell phone from the outside of the emergency call system terminal equipment 1, and the telephone numbers in the cell phone can be overwritten therefrom as well.

An emergency call system according to a sixth embodiment will now be described. In the emergency call system as illustrated in FIG. 1 or 2, an external interface signal from the control section 12 is applied to the outside of the emergency call system terminal equipment 1, thereby allowing the terminal equipment 1 to be electrically coupled to the external connection equipment 22. When a cell phone is used as the emergency call communication means 11, then the control section 12 is accessible from the external connection equipment 22 through either a non-synchronous serial or a synchronous serial signal because the control section 12 possesses an interface signal similar to the 16-core interface that is the external interface signal from the cell phone. The use of the non-synchronous serial or synchronous serial signal makes it possible to access the control section 12 from the external connection equipment 22. In addition, either a storage (not shown) of the control section 12 such as memory thereof or internal memory of the storage 15 connected to the control section 12 is accessible from the external connection equipment 22. Further, software updating and data input/output is achievable from the external connection equipment 22.

An emergency call system according to a seventh embodiment will now be described. In the emergency call system as illustrated in FIGS. 3A, 3B or FIGS. 4A, 4B, the connection interface 30 or 40 having the emergency call communication means 11 and the control section 12 electrically connected together is removed from the emergency call system terminal equipment 1 when the emergency call system is used for purposes except for normal use such as maintenance. As a result, an external interface signal from the emergency call communication means 11 can be sent out to the outside of the emergency call system terminal equipment 1.

In addition, the removal of the connection interfaces 30 or 40 from the emergency call system terminal equipment 1 allows the external connection equipment 21 to be electrically connected to the emergency call communication means 11. When a cell phone is used as the emergency call communication means 11, then a 16-core interface signal from the cell phone, i.e., an external interface signal therefrom is fed to the outside of the emergency call system terminal equipment 1, thereby allowing the cell phone to be controlled and maintained from the outside of the terminal equipment 1. As a result, a telephone number can be written to the cell phone from the outside of the emergency call system terminal equipment 1, and the telephone numbers in the cell phone can be overwritten therefrom as, well.

An emergency call system according to a eighth embodiment will now be described. In the emergency call system as illustrated in FIGS. 3A, 3B or FIGS. 4A, 4B, the connection interface 30 or 40 having the emergency call communication means 11 and the control section 12 electrically connected together is removed from the emergency call system terminal equipment 1 when the emergency call system is used for purposes except for normal use such as maintenance. As a result, an external interface signal from the control section 12 can be fed to the outside of the emergency call system terminal equipment 1.

In addition, the removal of the connection interfaces 30 or 40 from the emergency call system terminal equipment 1 allows the external connection equipment 22 to be electrically connected to the control section 12. As a result, either a storage (not shown) of the control section 12 such as memory thereof or internal memory of the storage 15 connected to the control section 12 is accessible from the external connection equipment 22. In addition, software updating and data input/output can be practiced from the external connection equipment 22.

An emergency call system according to a ninth embodiment will now be described. When a cell phone is used as the emergency call communication means 11 illustrated in FIGS. 1–4, then a 16-core interface signal from the cell phone, i.e., an external interface signal therefrom can be sent to the outside of the emergency call system terminal equipment 1.

An emergency call system according to a tenth embodiment will now be described. When a cell phone is used as the emergency call communication means 11 illustrated in FIGS. 1–4, then a 16-core interface signal from the cell phone, or rather an external interface signal therefrom can be applied to the outside of the emergency call system terminal equipment 1. Since the 16-core external interface signal can be sent and received between the cell phone and external connection equipment 21, data such as a telephone number and a memory dial can be written to the cell phone from the external connection equipment 21, and the data in the cell phone can be overwritten therefrom as well. In addition, the cell phone can be maintained from the external connection equipment 21 by access to internal memory of the cell phone therefrom.

An emergency call system according to an eleventh embodiment will now be described. When a cell phone is used as the emergency call communication means 11 illustrated in FIGS. 1–4, then a 16-core interface signal from the cell phone, or rather an external interface signal therefrom can be sent out to the outside of emergency call system terminal equipment 1. Since the 16-core external interface signal can be sent and received between the cell phone and external connection equipment 21, a telephone number can be written to the cell phone from the external connection equipment 21, and the telephone numbers in the cell phone can be overwritten therefrom as well.

An emergency call system according to a twelfth embodiment will now be described. When PHS is used as the emergency call communication means 11 illustrated in FIGS. 1–4, then an external interface signal from PHS can be sent out to the outside of emergency call system terminal equipment 1.

An emergency call system according to a thirteenth embodiment will now be described. When PHS is used as the emergency call communication means 11, then an external interface signal from PHS can be applied to the outside of emergency call system terminal equipment 1. Since the external interface signal can be sent and received between PHS and external connection equipment 21, data such as a telephone number and a memory dial can be written to PHS from the external connection equipment 21, and the data in PHS can be overwritten therefrom as well. In addition, PHS can be maintained from the external connection equipment 21 by access to internal memory of PHS therefrom.

An emergency call system according to a fourteenth embodiment will now be described. When PHS is used as the emergency call communication means 11 illustrated in FIGS. 1–4, then an external interface signal from PHS can be fed to the outside of emergency call system terminal equipment 1. Since the external interface signal can be sent and received between PHS and external connection equipment 21, a telephone number can be written to PHS from the external connection equipment 21, and the telephone numbers in PHS can be overwritten therefrom as well.

An emergency call system according to a fifteenth embodiment will now be described. In the emergency call system as illustrated in FIGS. 1–4, an interface signal from the control section 12 is fed to the outside of emergency call system terminal equipment 1, thereby allowing external connection equipment 22 to be electrically coupled to the control section 12. The external connection equipment 22 is communicated to the control section 12 using a communication format that is similar when the external connection equipment 21 is linked to the emergency call communication means 11. As a result, data in memory of the control section 12 is accessible from the external connection equipment 22. In addition, software updating and data input/output is achievable from the external connection equipment 22.

An emergency call system according to a sixteenth embodiment will now be described. In the emergency call system as illustrated in FIGS. 1–4, an interface signal from the control section 12 is applied to the outside of the emergency call system terminal equipment 1, thereby allowing external connection equipment 22 to be electrically connected to the control section 12. The external connection equipment 22 is communicated to the control section 12 using a communication format that is similar when the external connection equipment 21 is linked to the emergency call communication means 11. As a result, internal memory of the storage 15 that is connected to the control section 12 is accessible from the external connection equipment 22. In addition, software updating data input/output is achievable from the external connection equipment 22.

An emergency call system according to a seventeenth embodiment will now be described. In FIGS. 3A, 3B or FIGS. 4A, 4B, when the connection interface 30 or 40 is disconnected from the emergency call system terminal equipment 1 disposed in a vehicle, then a status indicating the disconnection of the connection interface 30 or 40 therefrom is conveyed to an information-transmitting means 18 such as a buzzer or LED for delivering information to a user. The information-transmitting means 18 advises the user of such disconnection of the connection interface 30 or 40 by means of sound, illumination, or display according to the status. Thus, the emergency call system is securely operated in a normal state.

An emergency call system according to an eighteenth embodiment will now be described. In FIGS. 3A, 3B or FIGS. 4A, 4B, when the connection interface 30 or 40 is disconnected from the emergency call system terminal equipment 1 disposed in a vehicle in a state of the emergency call system terminal equipment 1 being electrically conducting during engine operation, then a status indicating the disconnection of the connection interface 30 or 40 therefrom is fed into an information-transmitting means 18 such as a buzzer or LED for delivering information to a user. The information-transmitting means 18 advises the user of such disconnection of the connection interface 30 or 40 by means of sound, illumination, or display according to the status. Thus, the emergency call system is reliably operated in a normal state during vehicle travelling.

An emergency call system according to a nineteenth embodiment will now be described. In FIGS. 3A, 3B or FIGS. 4A, 4B, when the connection interface 30 or 40 is disconnected from the emergency call system terminal equipment 1 disposed in a vehicle, then a status indicative of the disconnection of the connection interface 30 or 40 therefrom is fed into an information-transmitting means 18 that includes an indicator such as a lamp or LED. The information-transmitting means 18 controls illumination of the indicator according to the status, and thereby notifies a user of such disconnection of the connection interface 30 or 40. Thus, the emergency call system is reliably operated in a normal state.

An emergency call system according to a twentieth embodiment will now be described. In FIGS. 3A, 3B or FIGS. 4A, 4B, when the connection interface 30 or 40 is disconnected from the emergency call system terminal equipment 1 disposed in a vehicle, then a status indicating the disconnection of the connection interface 30 or 40 therefrom is sent out to an information-transmitting means 18 that includes an indicator such as a lamp or LED. The information-transmitting means 18 turns on the indicator according to the status, and thereby notifies a user of such disconnection of the connection interface 30 or 40. Thus, the emergency call system is securely operated in a normal state.

An emergency call system according to a twenty first embodiment will now be described. In FIGS. 3A, 3B or FIGS. 4A, 4B, when the connection interface 30 or 40 is disconnected from the emergency call system terminal equipment 1 disposed in a vehicle, then a status representing the disconnection of the connection interface 30 or 40 therefrom is sent out to an information-transmitting means 18 that includes an indicator such as a lamp or LED. The information-transmitting means 18 flickers the indicator according to the status, and thereby notifies a user of such disconnection of the connection interface 30 or 40. Thus, the emergency call system is securely operated in a normal state.

An emergency call system according to a twenty second embodiment will now be described. In FIGS. 3A, 3B or FIGS. 4A, 4B, when the connection interface 30 or 40 is disconnected from the emergency call system terminal equipment 1 disposed in a vehicle, then a status representing the disconnection of the connection interface 30 or 40 therefrom is fed into an information-transmitting means 18 such as LCD or CRT for displaying data in characters. The information-transmitting means 18 notifies a user of such disconnection of the connection interface 30 or 40 by display according to the status. Thus, the emergency call system is reliably operated in a normal state.

An emergency call system according to a twenty third embodiment will now be described. In FIGS. 3A, 3B or FIGS. 4A, 4B, when the connection interface 30 or 40 is disconnected from the emergency call system terminal equipment 1 disposed in a vehicle, then a status representing the disconnection of the connection interface 30 or 40 therefrom is fed into an information-transmitting means 18 that includes a means for emitting a warning sound such as a beep. The information-transmitting means 18 notifies of a user of such disconnection of the connection interface 30 or 40 by the warning sound according to the status. In this way, the emergency call system is securely operated in a normal state.

An emergency call system according to a twenty fourth embodiment will now be described. In FIGS. 3A, 3B or FIGS. 4A, 4B, when the connection interface 30 or 40 is disconnected from the emergency call system terminal equipment 1 disposed in a vehicle, then a status indicating the disconnection of the connection interface 30 or 40 therefrom is fed into an information-transmitting means 18 that includes a means for making voice such as a synthetic voice. The information-transmitting means 18 advises a user of such disconnection of the connection interface 30 or 40 by voice according to the status. In this way, the emergency call system is reliably operated in a normal state.

An emergency call system according to a twenty fifth embodiment will now be described. In FIGS. 3A, 3B or FIGS. 4A, 4B, when the connection interface 30 or 40 is disconnected from the emergency call system terminal equipment 1 disposed in a vehicle, then a status representing the disconnection of the connection interface 30 or 40 therefrom is fed into a storage 15 such as memory. The storage 15 stores and records data as a history according to the status, which data indicates such disconnection of the connection interface 30 or 40.

An emergency call system according to a twenty sixth embodiment will now be described. In FIGS. 3A, 3B or FIGS. 4A, 4B, when the connection interface 30 or 40 is disconnected from the emergency call system terminal equipment 1 disposed in a vehicle in a state of the emergency call system terminal equipment 1 being electrically conducting during engine operation, then a status representing the disconnection of the connection interface 30 or 40 therefrom is fed into a storage 15 such as memory. The storage 15 stores and records data as a history according to the status, which data indicates such disconnection of the connection interface 30 or 40.

An emergency call system according to a twenty seventh embodiment will now be described. In FIGS. 3A, 3B or FIGS. 4A, 4B, when a status indicating that the connection interface 30 or 40 is disconnected from the emergency call system terminal equipment 1 disposed in a vehicle is transmitted to a user as a warning such as by display or sound, then data representing that the user has been warned of the disconnection of the connection interface 30 or 40 therefrom is fed into a storage 15 such as memory. The storage 15 stores and records such data as a history according to the status.

An emergency call system according to a twenty eighth embodiment will now be described. In FIGS. 3A, 3B or FIGS. 4A, 4B, a storage 15 such as memory stores either data indicating that the connection interface 30 or 40 is disconnected from the emergency call system terminal equipment 1 disposed in a vehicle or other data representing that a user has been warned of such disconnection of the connection interface 30 or 40.

When the storage 15 receives from external connection equipment 21, 22 a status indicating a request for the data contained in the storage 15, then data is fed into the external connection equipment 21, 22 according to the status under the control of the control section 12, which data includes either data indicating that the connection interface 30 or 40 is disconnected from the emergency call system terminal equipment 1 disposed in a vehicle or other data representing that a user has been warned of such disconnection of the connection interface 30 or 40.

An emergency call system according to a twenty ninth embodiment will now be described. In FIGS. 3A, 3B or FIGS. 4A, 4B, a storage 15 such as memory stores either data indicating that the connection interface 30 or 40 is disconnected from the emergency call system terminal equipment 1 disposed in a vehicle or other data representing that a user has been warned of such disconnection of the connection interface 30 or 40. When the storage 15 receives from external connection equipment 21, 22 through an interface signal from the control section 12 a status indicating a request for the data contained in the storage 15, then the data contained in the storage 15 is fed into the external connection equipment 21, 22 through the interface signal from the control section 12 under the control of the control section 12. The interface signal from the control section 12 is sent out to the outside of the emergency call system terminal equipment 1, like an external interface signal from a cell phone.

As evidenced by the above description, the emergency call system according to the present invention includes the emergency call communication means for telephoning the emergency call system-governing center via the telecommunication enterpriser's base station, the control section for controlling the emergency call communication means, thereby sending data such as on a vehicle's moving or heading direction as well as a vehicle's location to the emergency call system-governing center, and a connection interface for causing an interface signal to be sent and received between the emergency call communication means and the control section, and further for allowing the emergency call communication means and the control section to be relayed to the respective external connection equipment. The present invention provides the emergency call system adapted to permit the respective interface signals from the emergency call communication means and the control section for use in external connection to be fed to the outside of the emergency call system terminal equipment without the need for removal of the emergency call communication means from the emergency call system terminal equipment, and further designed to provide access to memory of the control section from the outside of the emergency call system terminal equipment.

What is claimed is:

1. An emergency call system terminal equipment to be disposed in a vehicle, comprising:

an emergency call communication means for telephoning an emergency call system-governing center via a telecommunication enterpriser's base station, said emergency call communication means being built in said emergency call system terminal equipment;

a control section for controlling said emergency call communication means, thereby sending data including a traveling or heading direction of said vehicle as well as a location of said vehicle to said emergency call system-governing center; and a connection interface detachably connected to said emergency call system terminal equipment for establishing connection between said emergency call communication means and said control section thereby allowing communication therebetween when said connection interface is attached to said emergency call system terminal equipment, and further for releasing said connection between said emergency call communication means and said control section and for allowing said emergency call communication means and said control section to be relayed to respective external connection equipment when said connection interface is detached from said emergency call system terminal equipment.

2. An emergency call system to be disposed in a vehicle, comprising:

an emergency call system terminal equipment adapted to automatically start sending data including a present location of said vehicle as well as registered details of said vehicle to an emergency call system-governing center in case of emergency, said emergency call system terminal equipment including an emergency call communication means inside said emergency call system terminal equipment and a control section located inside said emergency call system terminal equipment; and a connection interface detachably disposed outside said emergency call system terminal equipment, wherein said emergency call communication means and said control section can be communicated to one another through said connection interface when said connection interface is attached to said emergency call system terminal equipment, and wherein said emergency call communication means and said control section can be connected to respective external connection equipment while said connection between said emergency call communication means and said control section is released when said connection interface is detached from said emergency call system terminal equipment.

3. The emergency call system as defined in claim 1, wherein an external interface signal from said emergency call communication means is sent out to the outside of said emergency call system terminal equipment.

4. The emergency call system as defined in claim 1, wherein an external interface signal from said control section is sent out to the outside of said emergency call system terminal equipment.

5. The emergency call system as defined in claim 1, wherein removal of said connection interface from said emergency call system terminal equipment allows a signal from said external connection equipment to provide direct access to said emergency call communication means which may be a cell phone.

6. The emergency call system as defined in claim 1, wherein removal of said connection interface from said emergency call system terminal equipment allows a signal from said external connection equipment to provide direct access to said control section.

7. The emergency call system as defined in claim 1, wherein use of a cell phone as said emergency call communication means allows a signal from said external connection equipment to provide direct access to an external interface of said cell phone.

8. The emergency call system as defined in claim 1, wherein use of a cell phone as said emergency call communication means causes a signal from said external connection equipment to provide direct access to an external interface of said cell phone, thereby making it possible to gain access including writing, overwriting, and reading to a storage means of said cell phone which may be an internal memory thereof.

9. The emergency call system as defined in claim 1, wherein use of a cell phone as said emergency call communication means causes a signal from said external connection equipment to provide direct access to an external interface of said cell phone, whereby a phone number can be written to said cell phone from said external connection equipment, and further said phone number in said cell phone can be overwritten and read therefrom.

10. The emergency call system as defined in claim 1, wherein a signal from said external connection equipment is allowed to provide direct access to said control section inside said emergency call system terminal equipment, thereby making it possible to gain access including writing, overwriting, and reading to data in said control section.

11. The emergency call system as defined in claim 1, wherein a signal from said external connection equipment is allowed to provide direct access to said control section inside said emergency call system terminal equipment, thereby making it possible to gain access including writing, overwriting, and reading to data in a storage means such as memory, said storage means being linked to said control section.

12. The emergency call system as defined in claim 1, further including an information-transmitting means for notifying a user of removal of said connection interface from said emergency call system terminal equipment when said connection interface is removed therefrom.

13. The emergency call system as defined in claim 1, further including an information-transmitting means for notifying a user of removal of said connection interface from said emergency call system terminal equipment when said connection interface is removed therefrom in a state of said emergency call system terminal equipment being electrically conducting.

14. The emergency call system as defined in claim 12, wherein removal of said connection interface from said emergency call system terminal equipment can be recorded as a history under control of said control section when said connection interface is removed therefrom.

15. The emergency call system as defined in claim 12, herein removal of said connection interface from said emergency call system terminal equipment can be recorded as a history under control of said control section when said connection interface is removed therefrom in a state of said emergency call system terminal equipment being electrically conducting.

16. The emergency call system as defined in claim 12, wherein it can be recorded as a history under control of said control section that a user is notified of removal of said connection interface from said emergency call system terminal equipment by means of voice, display or illumination when said connection interface is removed therefrom.

17. The emergency call system as defined in claim 12, wherein a history is fed into said external connection equipment under control of said control section when said connection interface is removed from said emergency call system terminal equipment, said history recording such removal of said connection interface therefrom.

18. The emergency call system as defined in claim 12, wherein a history is fed into external connection equipment through an interface signal from said control section under control of said control section when said connection interface is removed from said emergency call system terminal equipment, said interface signal from said control section being sent out to the outside of said emergency call system terminal equipment, said history recording such removal of said connection interface therefrom.

\* \* \* \* \*